(12) United States Patent
Neuhoff et al.

(10) Patent No.: US 7,151,324 B2
(45) Date of Patent: Dec. 19, 2006

(54) ELECTRIC STEERING LOCK

(75) Inventors: Stefan Neuhoff, Essen (DE); Reiner Buchner, Sinzing (DE)

(73) Assignees: Huf Hülsbeck +Fürst GmbH & Co, KG, Velbert (DE); Siemens AG, Müchen (DE)

( * ) Notice: Subject to any disclaimer, the term of this patent is extended or adjusted under 35 U.S.C. 154(b) by 355 days.

(21) Appl. No.: 10/480,756

(22) PCT Filed: Jun. 1, 2002

(86) PCT No.: PCT/EP02/06020

§ 371 (c)(1),
(2), (4) Date: Dec. 11, 2003

(87) PCT Pub. No.: WO02/102631

PCT Pub. Date: Dec. 27, 2002

(65) Prior Publication Data

US 2004/0113492 A1    Jun. 17, 2004

(30) Foreign Application Priority Data

Jun. 16, 2001 (DE) .............................. 101 29 095

(51) Int. Cl.
*B60R 25/02* (2006.01)
(52) U.S. Cl. .................. 307/10.2; 70/186; 70/276; 324/207.2; 324/207.24
(58) Field of Classification Search ............ 324/207.2, 324/207.24; 307/10.2; 70/186, 276
See application file for complete search history.

(56) References Cited

U.S. PATENT DOCUMENTS 5,084,674 A * 1/1992 Lachmann et al. ......... 324/174
5,865,049 A * 2/1999 Friedrich et al. ............. 70/276
6,236,121 B1 * 5/2001 Kemmann et al. ......... 307/10.5
6,380,642 B1 * 4/2002 Buchner .................... 307/10.3
2003/0145663 A1 * 8/2003 Heisenberg et al. ... 73/862.324

FOREIGN PATENT DOCUMENTS

DE    198 09 295 C1    5/1999
WO    0100462          1/2001

\* cited by examiner

*Primary Examiner*—Brian Sircus
*Assistant Examiner*—Andrew Deschere
(74) *Attorney, Agent, or Firm*—Friedrich Kueffner

(57) ABSTRACT

The invention relates to an electric steering lock wherein a permanent magnet (20) and two different Hall sensors (21,22) are used to recognise a locking and an unlocking position. The pole transition (23) of the magnet (20) is oriented in the direction of the lift (14). In order to increase efficiency, one sensor (21) is south-pole active and the other (22) is north-pole active. The sensors (21,22) are arranged in an intermediate area (25) between both end positions (10.1, 10.2) of the pole transition (23) of the permanent magnet (20) and are disposed at a defined end distance (38, 39) from both end positions (10.1, 10.2). At said end distance (10.1), the N-active sensor (21) is oriented towards the north pole and the S-active sensor (22) is oriented towards the south pole of the permanent magnet. Said end distance (38, 39) corresponds to the distance at which the magnetic flow density (30.1) of the permanent magnet (20) is at least identical to the threshold value (21.1) required to turn on (28.1, 29.1) the N or-S-active sensor (21) at the highest temperature occurring during the use thereof.

1 Claim, 3 Drawing Sheets

ELECTRIC STEERING LOCK

Figure 1:
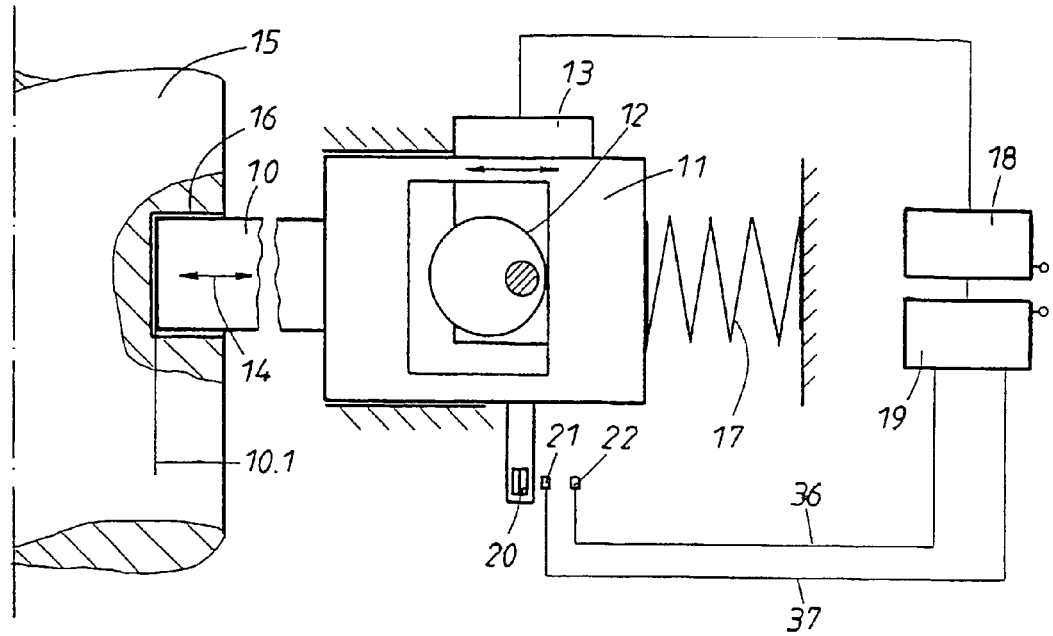

The invention pertains to an electric steering lock of the type indicated in the introductory clause of the claim. A position recognition device exists, which monitors the position of a locking pin to determine which of its two end positions it is occupying; that is, the pin can be either in its locking position, in which the steering column of the vehicle is prevented from turning, or in an unlocking position, in which the steering column is free to turn. This device comprises two Hall sensors and a permanent magnet, which moves concomitantly with the locking pin. Because motor vehicles are used everywhere in the world, steering locks must be able to function properly under any environmental temperatures which may occur in practice. It is very expensive to fulfill this requirement with the known steering lock system.

In the known device of this type (DE 199 29 435 A1), a digital Hall sensor and an analog Hall sensor are used. The analog Hall sensor operates over such a long distance that both Hall sensors respond when the locking pin is in one of its end positions. The large response range of the analog Hall sensor is also said to make it possible for the associated evaluation unit to monitor the change over time in the signals being received. No malfunctions of this known device associated with the simultaneous response of the two Hall sensors have been reported. An essential disadvantage of the known device, however, is that the response ranges of the Hall sensors and the magnetic flux of the permanent magnet decrease with increasing temperature, for which reason the known steering lock does not make it possible for the position of the locking pin to be detected in a reliable manner.

There is another electric steering lock, in which identical digital Hall sensors are installed in the intermediate space between the two end positions of the permanent magnet. The two identical sensors are S-active; that is, when they travel over the pole transition of the permanent magnet, they respond only to the south pole. When the locking pin is in one of its end positions, one of the sensors will indeed respond, but neither of the two sensors responds when the pin is in the other end position. The other sensor responds to the flat section of the curve, in which the flux density changes quickly as a function of the environmental temperature. For this reason, the evaluator uses the shut-off of the Hall sensor as a switching signal. In the end position, therefore, there is no longer any signal available from this sensor.

The invention is based on the task of developing a reliable, simple steering lock of the type indicated in the introductory clause of the claim, which operates properly at all possible temperatures which may occur during operation and which ensures that the position of the locking pin will be detected in a reliable manner. This is accomplished according to the invention by the measures indicated in the claim, to which the following special meaning attaches.

By using sensors which are different from each other, that is, an N-active sensor and an S-active sensor, and by positioning them in the intermediate space, where each faces the pole of the permanent magnet after which it is named, the electric drive is always turned off by the stroke of the pin in a steep section of the distance-dependent magnetic flux density curve when the flux density exceeds the given threshold value of the Hall sensor. For physical reasons, the temperature dependence of the switchover point is very weak in this steep section of the curve. As a result, the locking pin will never be controlled improperly when in one of the positions; regardless of the temperature, the pin will always be in the desired defined locking or unlocking position.

As a result of the final distance, stated in the claim, of the sensor with its pole-dependent response from the pole of the of the same name, the invention also ensures that, in both end positions, either the N-active or the S-active Hall sensor will supply a clear signal to the evaluator. Because of the magnitude of this final distance as stated in the claim, this capacity to supply a clear signal is ensured at any temperature which may occur during the operation of the vehicle. To implement the static position detection function, use is made of the flat section of the magnetic flux density curve, which is in and of itself a function of temperature, and there is thus no need to resort to expensive sensors or analog control means. When, in the invention, both Hall sensors are turned on, there is obviously an operational malfunction. This is detected by the evaluator and leads to appropriate precautionary reactions. The evaluator is also able to detect the reverse movement phase of the locking pin, for neither of the two Hall sensors responds to the permanent magnet when it is in the gap between the two sensors. The evaluator does not respond until, in the final phase of this reverse movement, the steep, temperature-independent section of the magnetic flux curve acts on the Hall sensor belonging to the pole of the same name and thus the given temperature-dependent threshold value is exceeded. The invention can unambiguously detect the various positions of the locking pin, evaluate them, and display them, even if the length of the stroke is only a few millimeters. The invention is characterized by a very high level of reliability.

Figure 2:
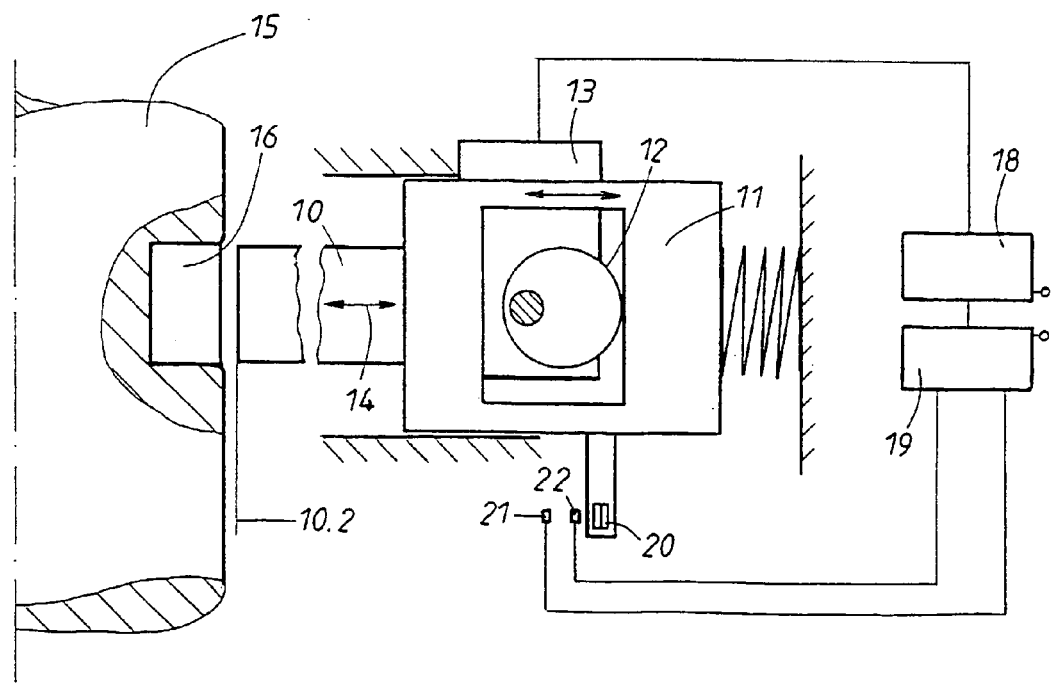
Figure 3:
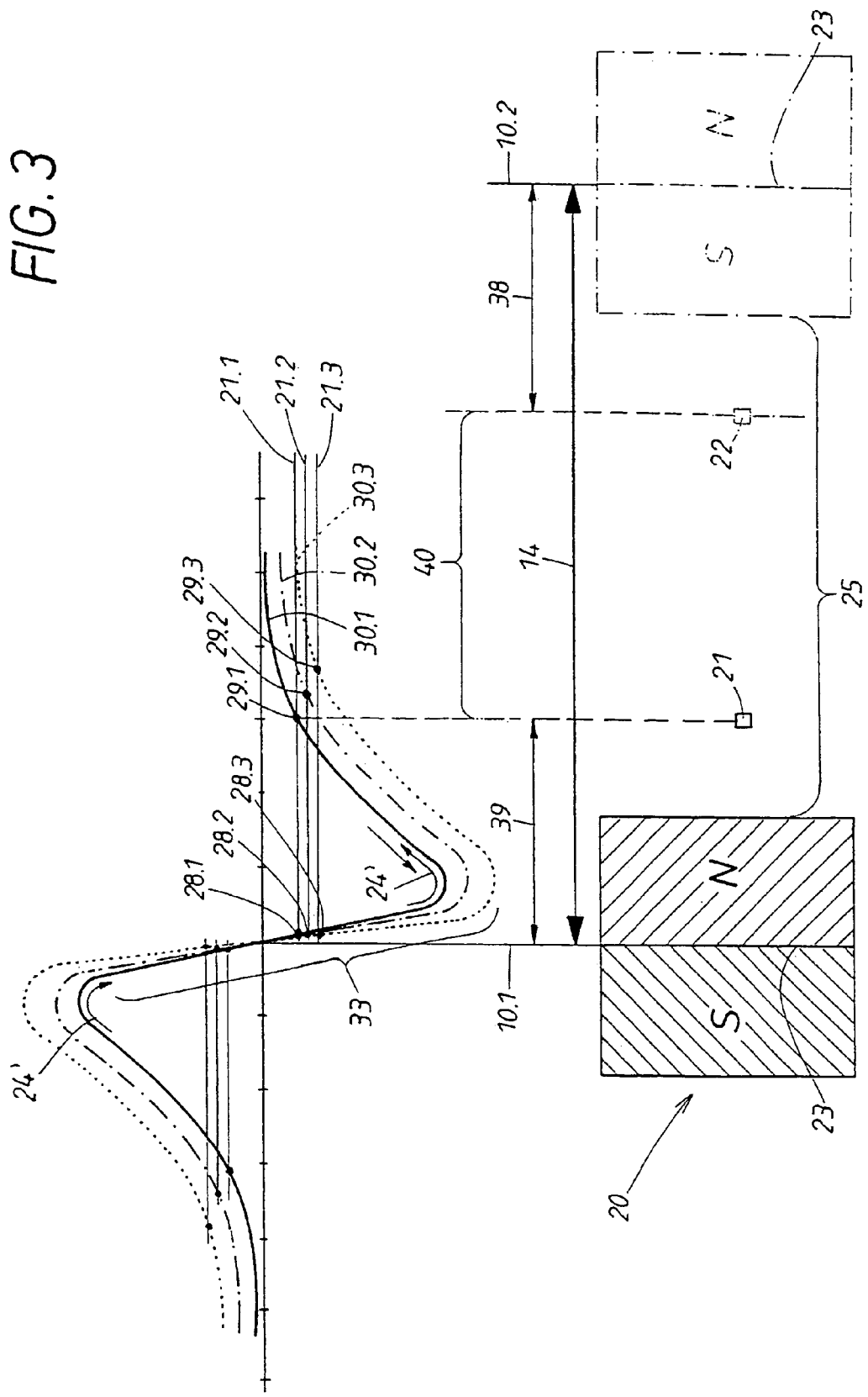
Figure 4:
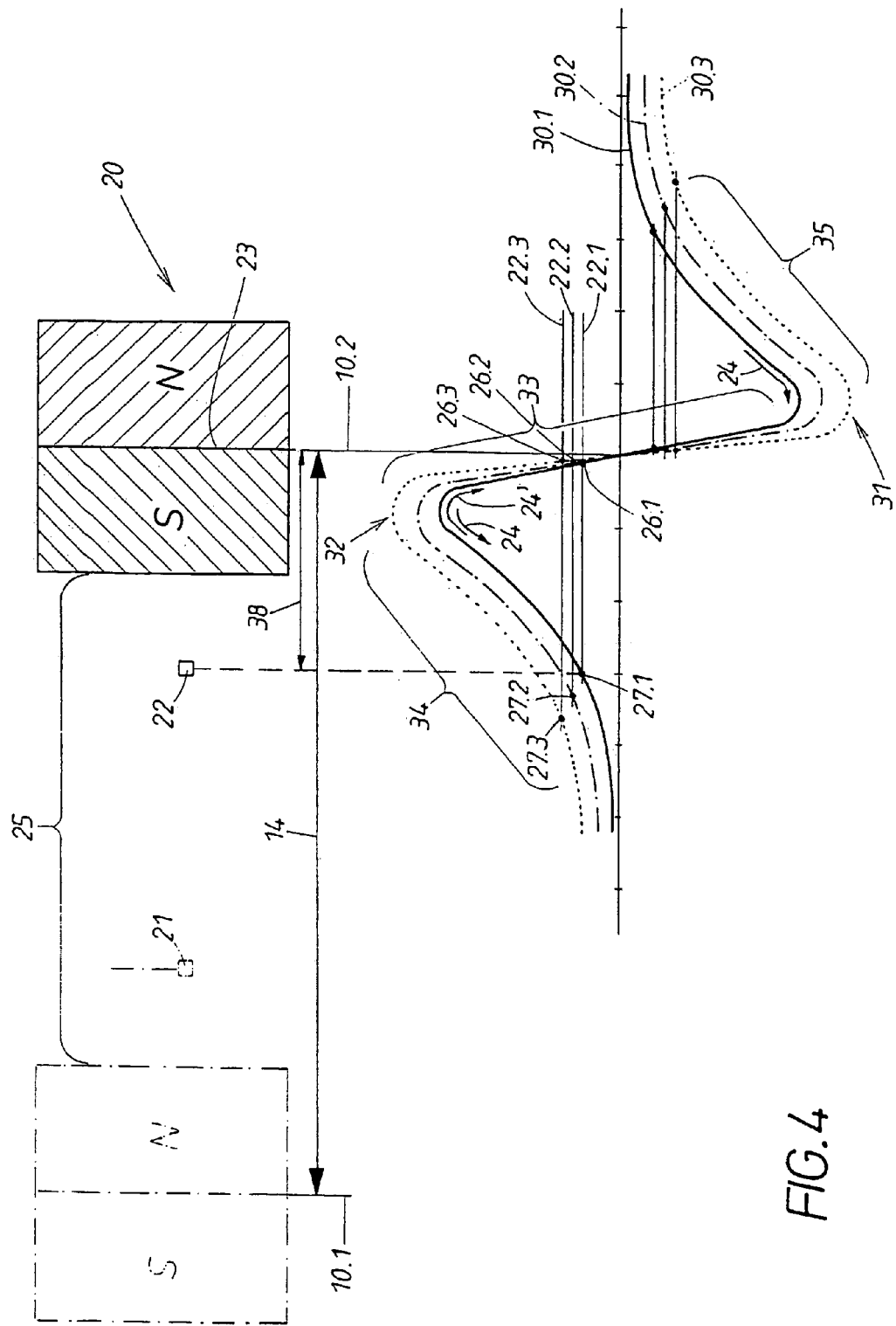

The invention is illustrated schematically in the drawings on the basis of an exemplary embodiment:

FIGS. 1 and 2 show the most essential components of the steering device according to the invention, namely, the device as it appears in the locking position in FIG. 1 and as it appears in the unlocking position in FIG. 2;

FIG. 3 uses the temperature-dependent magnetic flux density curve of the permanent magnet to explain, in highly magnified form, how the steering lock according to the invention works in the locking position of the locking pin; and FIG. 4 shows, in analogous fashion, how the device functions in the unlocking position.

The steering lock comprises a locking pin 10, which is moved longitudinally in the direction of the arrow 14 by actuating means 11–13 between the two end positions designated by the auxiliary lines 10.1 and 10.2. In the one end position 10.1, the locking pin 10 engages in an opening 16, connected nonrotatably to a steering column. As a result, the steering column 15 is locked. The one end position 10.1 thus proves to be the "locking position" of the locking pin 10.

The actuating movement 14 of the locking pin 10 proceeds by way of a slide 11, which is moved by a motor 13 acting by way of a cam 12 with the cooperation of a restoring spring 17. An electric control unit 18 is responsible for turning the motor 13 on and off; this unit is influenced not only by an evaluator 19 but also by an actuator (not shown), which consists, for example, of a lock cylinder, operated by a key. When the actuator is put into action, the motor 13 is turned on by the control unit 18. The cam 12 thus moves the slide 11 against the action of the restoring spring 17 into the other end position 10.2 of FIG. 2, where a special method of distance detection is implemented.

The distance detection function of the steering lock is accomplished by a permanent magnet 20, which moves concomitantly with the slide 11, and by two different Hall sensors 21, 22. The relationships thus obtained are illustrated in highly magnified form in FIGS. 3 and 4. The two poles of the magnet 20 are designated S and N. The permanent magnet 20 is attached to the slide 11 in such a way that the pole transition, designated 23, passes over the two sensitive surfaces 21, 22 of the Hall sensors during the actuating movement designated here by the number 14. As previously mentioned, FIGS. 3 and 4 show the two end positions 10.1 and 10.2 of FIGS. 1 and 2. In these figures, curves 30.1–30.3 are entered in alignment with the pole transition 23 as they appear at the two end positions 10.1 and 10.2; these curves represent the magnetic flux density at various temperatures as a function of distance. By definition, the south pole thus has the positive direction of the flux density, and the north pole has the corresponding negative direction. Because the magnetic flux density is a function of temperature, three curves are shown in FIGS. 3 and 4 for three different temperatures. The curve designated 30.1 applies to the highest temperature which can occur during operation, namely, a temperature of approximately +80° C.; curve 30.2 applies to an intermediate temperature of approximately +20° C.; and curve 30.3 applies to a low temperature of −40° C.

It is important to note that the flanks 33–35 of the curves 30.1–30.3 on one side of their maxima 32 and their minima 31 are very different from those on the other side. The curve flanks 33 in the area of the pole transition 23 are relatively steep. Here the branches of the three curves 30.1–30.3 almost coincide. The two outer branches have much flatter flanks 34, 35, where the values for the flux density are more highly dependent on temperature.

The two Hall sensors 21, 22 are of different design. The one sensor 21 is north pole-active, whereas the other sensor 22 is south pole-active. The two Hall sensors 21, 22 are located in the intermediate space 25 between the two end positions 10.1 and 10.2 of the permanent magnet 20. The S-active sensor 22 faces the south pole when the permanent magnet 20 is in the end position 10.2, whereas the N-active sensor 21 faces the north pole when the permanent magnet 20 is located in its end position 10.1. The sensors 21, 22 do not respond until a certain threshold of the magnetic flux density has been reached. These threshold values are also a function of temperature and are designated 22.1–22.3 and 21.1–21.3 in the diagrams. The lines 21.1–22.3 correspond to the sensitivity of the two sensors 21, 22 at the three cited temperatures of +80° C., +20° C., and −40° C. The least favorable relationships are present at the highest temperature, namely, at 80° C.

Let the starting point be the locking position 10.1 of FIG. 1. The actuating movement 14 is initiated by the actuating means 11–13. When the permanent magnet approaches the other end position 10.2 shown in FIGS. 2 and 4, the sensor 22 does not respond as long as the flank 35 with negative flux density values of the assumed curve 30.1 is passing over the sensor 22. The sensor 22 becomes active in this case only when the threshold value 22.1 has been reached, i.e., when the flux density has reached a sufficiently large positive value. The S-sensitive surface of the sensor 22 passes along the curve 30.1 in the direction designated by the arrow 24. The sensor responds at the point 26.1 on the steep flank 33 of the curve because of the now applicable threshold value 22.1 and transmits this over the line 36 to the evaluator 19. The evaluator 19 tells the control unit 18 to turn off the motor with a defined slow-down in such a way that the permanent magnet 20 remains at a defined final distance 38. This distance 38 is calculated in such a way that it comes before the turn-off point 27.1 of the sensor 22 on the least favorable curve 30.1 in the diagram of FIG. 4. In the end position 10.2, therefore, the sensitive surface 22 of the S-active sensor is still located in a magnetic field (at 27.1 of curve 30.1) which is sufficiently strong to activate it. The sensor 22 is thus still active in this position 10.2 and transmits this information to the evaluator 19. In the position 10.2, the relationships illustrated in FIG. 2 are present, where the locking pin 10 is located outside the steering column opening 16. The steering-column 15 is free to turn. The end position 10.2 thus proves to be the "unlocking position" of the device.

In the invention, the Hall sensor 22 remains active even when temperatures lower than the +80° C. being assumed here prevail. This is illustrated in FIGS. 3 and 4 by curves 30.2 and 30.3. It is important that the analogous turn-on points 26.2 and 26.3 on the steep flank 33 are practically in the same place, for which reason, regardless of the temperature, the switchover at points 26.2 and 26.3 occurs practically at the same place as the switchover at point 26.1. The corresponding turn-off points 27.2 and 27.3 on the alternative curves 30.2 and 30.3 for the temperature-dependent threshold values 22.2 and 22.3 are, it is true, spread over a wide range on the outer, flatter flank 34 of these curves, but this is irrelevant for the following reason. Because the final distance 38 was selected on the basis of the curve 30.1 representing the highest temperature, the sensor 22 remains active in position 10.2 of FIG. 4 even at the lower temperatures of curves 30.2 and 30.3. Because of the permanent power-on status of the sensor 22, the evaluator 19 is able to determine unambiguously the unlocking position 10.2 of the locking pin 10 over the entire temperature range of 30.1–30.3 when the permanent magnet is at the final distance 38 from the sensor.

When the locking pin is supposed to leave the unlocking position 10.2, the person authorized to access the vehicle must again perform the specific type of actuation required for the selected system, e.g., using a mechanical or electric key to turn the associated sensor or lock cylinder back in the other direction and then removing the key. The control unit 18 will then activate the actuating means 11–13 again, which causes the actuating movement 14 to occur in the opposite direction. The assumed curve 30.1 is now traversed in the direction of arrow 24' of FIG. 4 and especially of FIG. 3. Because of the remanence, the S-active sensor is turned off slightly below the switching point 26.1 and remains turned off after the locking position 10.1 of FIGS. 1 and 3 has been reached. As shown by curve 30.1 of FIG. 1, the N-active sensor 21 does not respond until the switching point 28.1 of the return stroke has been reached, where the curve 30.1 intersects the temperature-dependent threshold value 21.1 of this sensor 21. The turn-on signal of the Hall sensor 21 is transmitted via the other line 37 to the evaluator 19, which then stops the motor 13 again by way of the control unit 18. During the time that there is no actuating movement 14, the N-active sensor 21 is located at a final distance designated 39 in FIG. 3, where the turn-off point designated 29.1 on curve 30.1 in FIG. 3 has not yet exceeded the threshold value 21.1. At the distance 39, therefore, the Hall sensor 21 is active, which the evaluator 19 detects.

These relationships do not change when the steering lock according to the invention is used at lower temperatures such as those shown, for example, by the additional curves 30.2 and 30.2, also appearing in FIG. 3, which, as previously mentioned, correspond to temperatures of approximately +20° C. and −40° C., respectively. The switchover points 28.2 and 28.3 lying on the path of the reverse movement 24' are practically in the same place again because of their position on the steep flank 33 and have the effect of turning off the motor 13 in a manner practically independent of temperature. The analogous turn-off points 29.2 and 29.3 are outside the selected final distance 39. The sensor 21 thus remains turned on at the final distance 39 even at the lower temperatures 30.2 and 30.3. The evaluator 19 clearly recognizes the locking position 10.1 over the entire range of temperatures.

The evaluator 19 also detects the segment 40 between the two terminal sections 38, 39 of the actuating movement 14. In this transition area 40, neither of the two sensors 21, 22 are active. This information is also sent to the evaluator 19, which instructs the control unit 18 accordingly. The previously initiated actuation of the motor 15 continues until, as previously described, one of the two sensor 21, 22 is turned on as a function of temperature at either points 26.1–26.3 or points 28.1–28.3, which are situated at practically the same spot.

The invention makes it possible to detect very short strokes with close tolerances and performs its task with the help of only a single permanent magnet 20. It is impossible for both of the Hall sensors 21, 22 to become active at the same time if the steering lock according to the invention is operating properly. If this should nevertheless occur, the evaluator 19 recognizes a malfunction, and appropriate error messages and activities are initiated in the system. Each of the two end positions 10.1 and 10.2 is confirmed by one of the two activated Hall sensors 21, 22. When the system is started, the position of the magnet is unambiguously determined on the basis of the difference between the activity and lack of activity of the sensors 21, 22.

LIST OF REFERENCE NUMBERS

10 locking pin
10.1 first end position, locking position
10.2 second end position, unlocking position
11 actuating means, slide for 10
12 actuating means, cam for 11
13 actuating means, motor for 12
14 arrow of the stroke of 10, stroke distance
15 steering column
16 opening in 15 for 10
17 restoring spring for 10, 11
18 electronic control unit
19 evaluator for 21, 22
20 permanent magnet
21 N-active Hall sensor
21.1 threshold value of 21 at +80° C.
21.2 threshold value of 21 at +20° C.
21.3 threshold value of 21 at −40° C.
22 S-active Hall sensor
22.1 threshold value of 22 at +80° C.
22.2 threshold value of 22 at +20° C.
22.3 threshold value of 22 at −40° C.
23 pole transition of 20
24 path traveled on 30.1 from 10.1 to 10.2
24' reverse path traveled from 10.2 to 10.1
25 intermediate space between 10.1 and 10.2 of 20
26.1 turn-on point of 22 on 30.1
26.2 turn-on point of 22 on 30.2
26.3 turn-on point of 22 on 30.3
27.1 turn-off point of 22 on 30.1
27.2 turn-off point of 22 on 30.2
27.3 turn-off point of 22 on 30.3
28.1 turn-on point of 21 on 30.1
28.2 turn-on point of 21 on 30.2
28.3 turn-on point of 21 on 30.3
29.1 turn-off point of 21 on 30.1
29.2 turn-off point of 21 on 30.2
29.3 turn-off point of 21 on 30.3
30.1 curve of the magnetic flux density of 20 at +80° C.
30.2 curve of the magnetic flux density of 20 at +20° C.
30.3 curve of the magnetic flux density of 20 at −40° C.
31 minimum of 30.1–30.3
32 maximum of 30.1–30.3
33 steep flank of 30.1–30.3
34 flat flank of 30.1–30.3 at S flux density
35 flat flank of 30.1–30.3 at N flux density
36 line between 22 and 19
37 line between 21 and 19
38 final distance between 22 and 23
39 final distance between 21 and 23
40 transition region for 23 between 21 and 22 (FIGS. 3, 4)

The invention claimed is:

1. Electric steering lock for motor vehicles with a locking pin (10) which, with respect to a steering column (15), can move back and forth (14) between a locking end position (10.1) and an unlocking end position (10.2); with a device for detecting the position of the locking pin (10), comprising:

a permanent magnet (20) and two different Hall sensors (21, 22), which are connected to an evaluator (19);
where the permanent magnet (20) or the Hall sensors (21, 22) move back and forth (14) along with the locking pin (10) and where, during this concomitant movement (14), a pole transition (23) of the permanent magnet (20) passes over the Hall sensors (21, 22), and
one sensor (21) monitors the locking position (10.1), while the other sensor (22) monitors the unlocking position (10.2), wherein,
both sensors (21, 22) are digital, one of the sensors (22) is S-active, whereas the other sensor (22) is N-active,
the two Hall sensors (21, 22) are mounted in an intermediate space (25) between the two end positions (10.1, 10.2) of the pole transition (23) of the permanent magnet (20) and have a defined final distance (38; 39) in the two end positions (10.1, 10.2),
when in one end position (10.1), the N-active sensor (21) faces the north pole of the permanent magnet (20), and when in the other end position (10.2) the S-active sensor (22) faces the south pole of the permanent magnet (20), and
the final distance (38; 39) corresponds to a distance at which the magnetic flux density (30.1) of the permanent magnet (20) at a highest temperature which can occur during operation is at least equal to a threshold value (22.1, 21.1) required to turn on (26.1, 27.1; 28.1, 29.1) the N- or S-active sensor (22; 21).

* * * * *